(No Model.)

E. D. WASSELL.
VEHICLE WHEEL.

No. 541,516. Patented June 25, 1895.

Witnesses
D. A. Tauberschmidt.
D. Werner Reinohls

Inventor
Edwin D. Wassell.
By D. C. Reinohl
Attorney

THE NORRIS PETERS CO., PHOTO-LITHO., WASHINGTON, D. C.

UNITED STATES PATENT OFFICE.

EDWIN D. WASSELL, OF PITTSBURG, PENNSYLVANIA.

VEHICLE-WHEEL.

SPECIFICATION forming part of Letters Patent No. 541,516, dated June 25, 1895.

Application filed October 30, 1894. Serial No. 527,477. (No model.)

*To all whom it may concern:*

Be it known that I, EDWIN D. WASSELL, a citizen of the United States, residing at Pittsburg, in the county of Allegheny and State of Pennsylvania, have invented certain new and useful Improvements in Vehicle-Wheels; and I do hereby declare the following to be a full, clear, and exact description of the invention, such as will enable others skilled in the art to which it appertains to make and use the same.

My present invention relates to vehicle-wheels, and has for its object certain improvements which will be fully disclosed in the following specification and claims.

Figure 1:
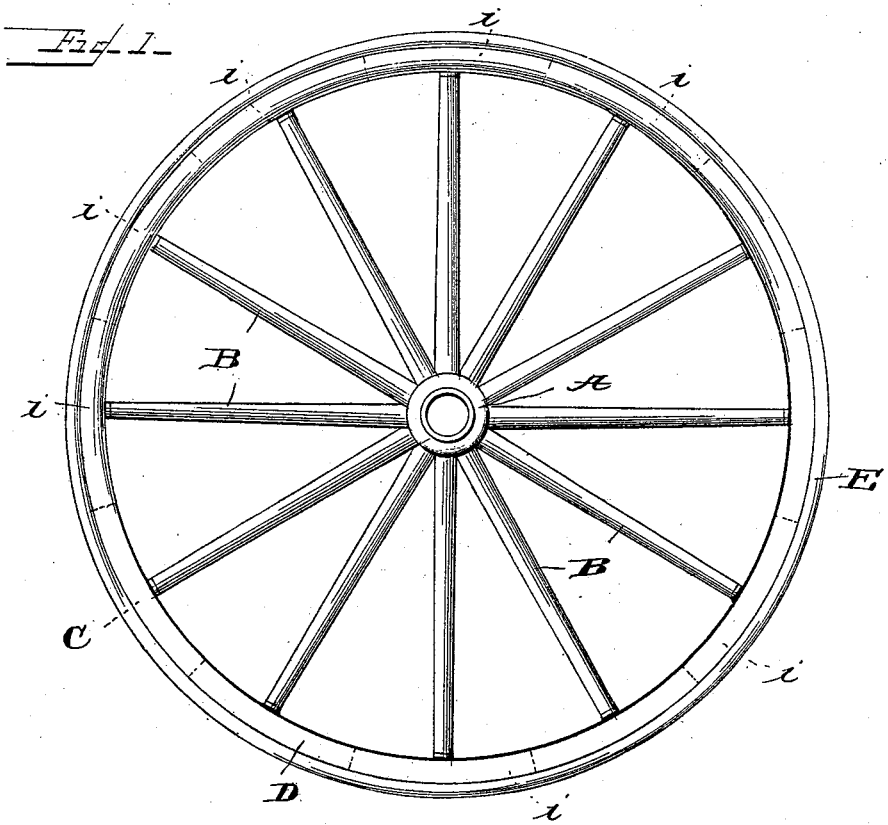
Figure 2:
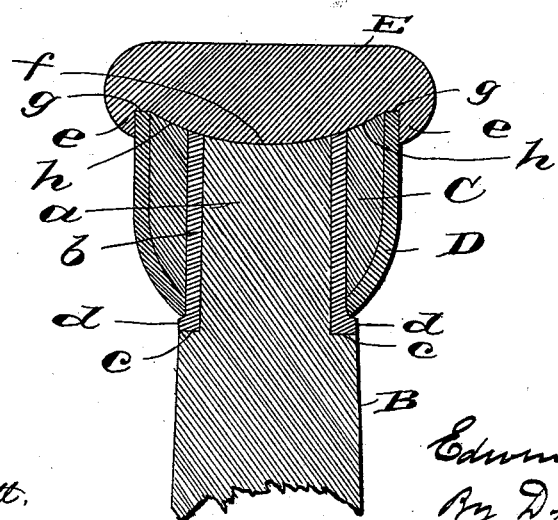

In the accompanying drawings, which form part of this specification, Figure 1 is a side elevation of my improved wheel; and Fig. 2, a transverse section through the tire, felly, casing, and one spoke, on an enlarged scale.

Reference being had to the drawings and the letters thereon, A indicates the hub; B, the spokes; C, the wooden felly; D, the felly-casing, and E the tire.

On the outer end of the spokes is a tenon $a$ to receive a metallic ferrule $b$, the inner end of which ferrule rests upon a shoulder $c$ on the spokes, and the spoke and the ferrule pass through the metallic felly-casing D and enter the wooden felly C. The casing D fits the felly C closely and the ferrule extends beyond the inner wall of the casing to protect the spoke against wear from casing; and for some wheels, the ferrule may be provided with an annular collar $d$ to take the inward thrust of the tire, felly and felly-casing.

The tire E is provided with continuous inwardly projecting flanges $e\ e$ on each side which engage the outer edge of the casing D and secure the tire upon the felly when properly shrunk thereon without the use of bolts. The inner surface of the tire may be convex in cross section from the flat seats $g\ g$ against which the edges of the casing rest and the outer surface $h$ of the felly is made correspondingly concave.

The felly is made in short sections $i$ one to each spoke, as shown in dotted lines in Fig. 1 to facilitate the removal of the felly to replace a broken spoke and for the same reason the felly-casing is open between its edges so that the sections of felly can be readily inserted over the outer end of each spoke and removed when required.

Having thus fully described my invention, what I claim is—

1. In a vehicle-wheel, wooden spokes provided with ferrules at their outer ends, a wooden felly and a metallic felly-casing engaging the ferrules on the spokes, in combination with a tire provided with inwardly projecting flanges on its edges and seats for the edges of the casing adjacent to said flanges.

2. In a vehicle-wheel, wooden spokes provided with ferrules at their outer ends having an annular collar at their inner ends a wooden felly and a metallic felly-casing engaging the collars on the ferrules of the spokes, in combination with a tire provided with inwardly inclined projecting flanges on its edges and seats for the edges of the casing adjacent to said flanges.

3. In a vehicle-wheel, wooden spokes provided with tenons and shoulders at their outer ends, metallic ferrules on said tenons, a wooden felly and a metallic felly-casing engaging the ferrule on the spokes, in combination with a tire provided with inwardly projecting flanges on its edges and seats for the edges of the casing adjacent to said flanges.

4. In a vehicle-wheel, wooden spokes provided with ferrules at their outer ends, a wooden felly having a concave outer surface and a metallic felly-casing engaging the ferrules on the spokes, in combination with a tire provided with inwardly projecting flanges, seats for the edges of the casing adjacent to said flanges and a convex surface between said seats.

5. In a vehicle-wheel, wooden spokes provided with ferrules at their outer ends, a wooden felly made in sections equal in number to the spokes of the wheel and a metallic felly-casing open between its edges, in combination with a tire provided with inwardly projecting flanges on its edges and seats for the edges of the casing adjacent to said flanges.

In testimony whereof I affix my signature in presence of two witnesses.

EDWIN D. WASSELL.

Witnesses:
H. E. SEIBERT,
CHAS. H. GAILFUSS.